April 4, 1939.　　　J. A. J. BENNETT　　　2,152,861
BLADE CONSTRUCTION FOR AIRCRAFT SUSTAINING ROTORS
Filed May 14, 1935　　　4 Sheets-Sheet 1
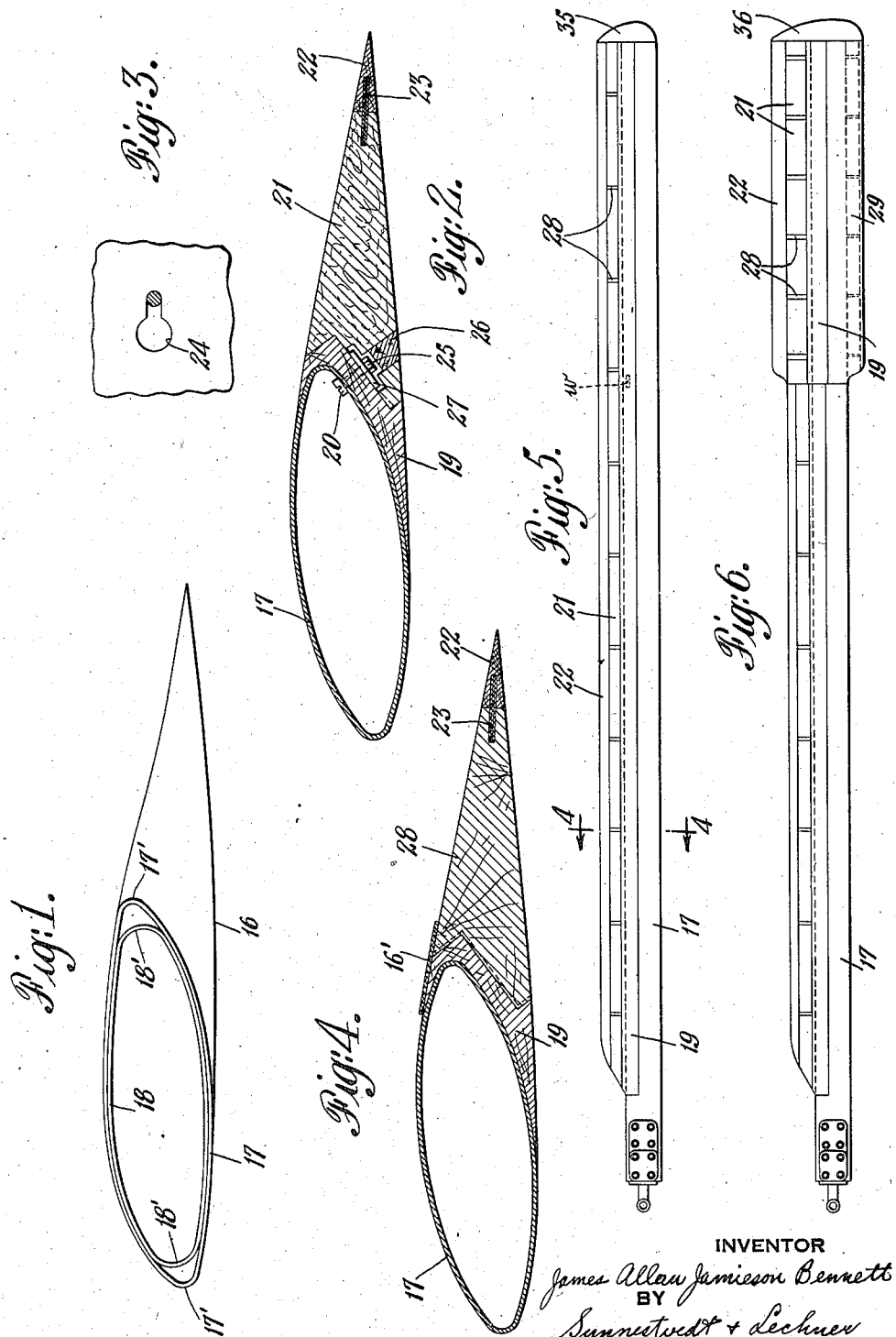
INVENTOR
James Allan Jamieson Bennett
BY
Synnestvedt + Lechner
ATTORNEYS April 4, 1939. J. A. J. BENNETT 2,152,861
BLADE CONSTRUCTION FOR AIRCRAFT SUSTAINING ROTORS
Filed May 14, 1935 4 Sheets-Sheet 2
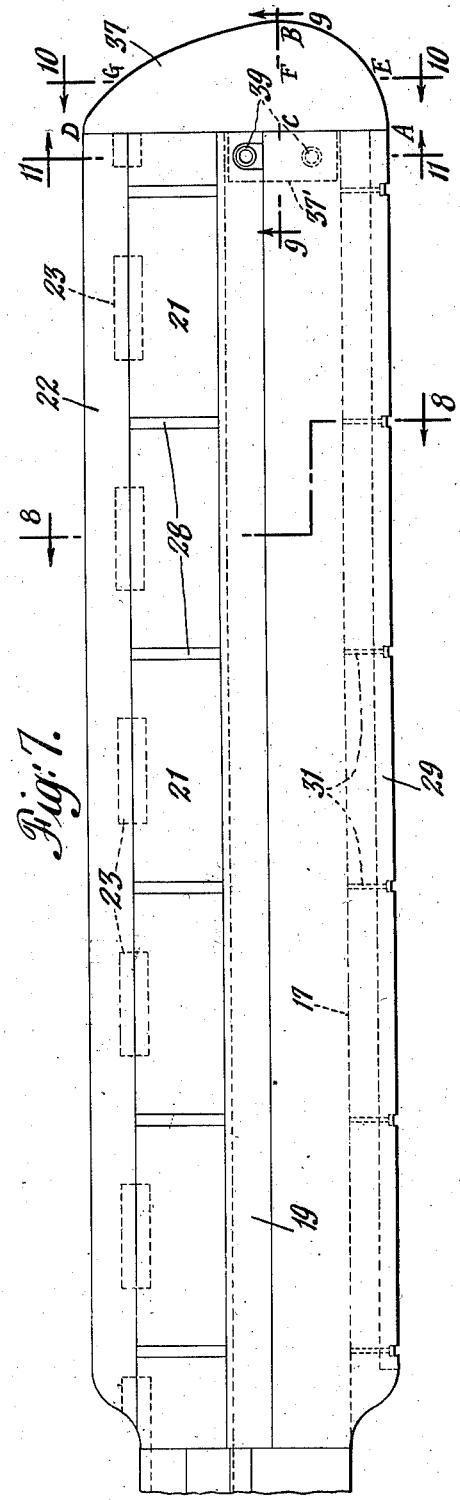
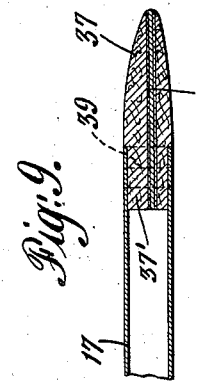
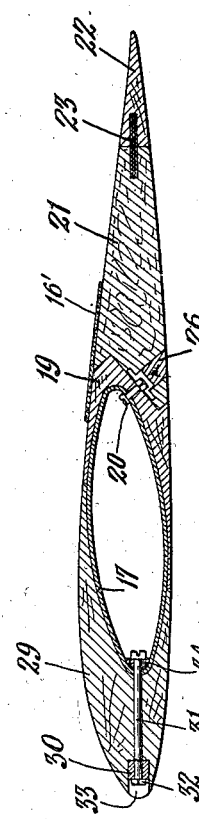
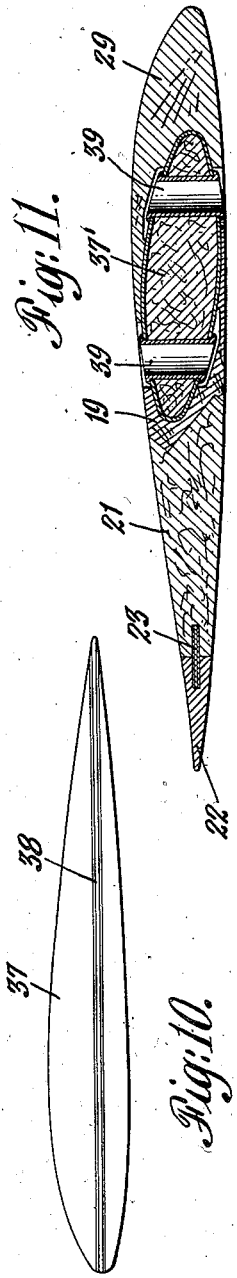
INVENTOR
James Allan Jamieson Bennett
BY
Synnestvedt & Lechner
ATTORNEYS

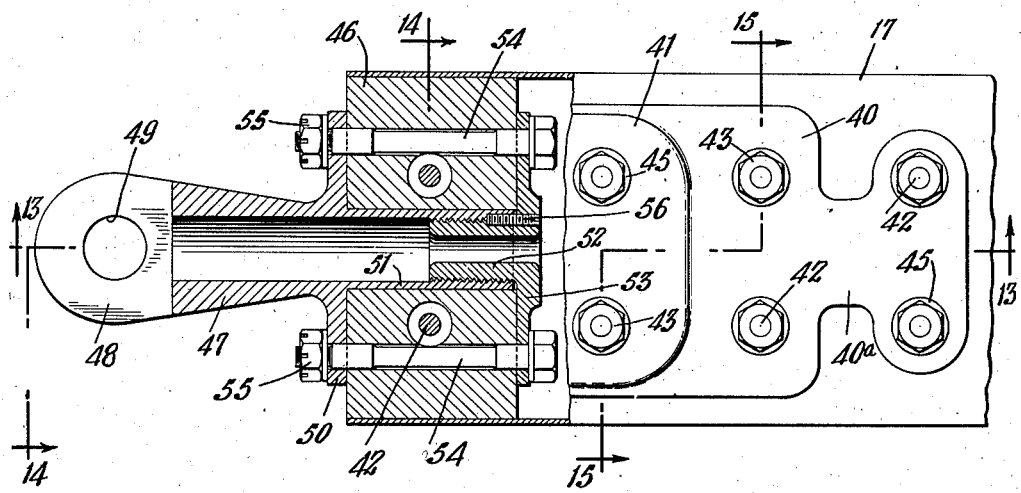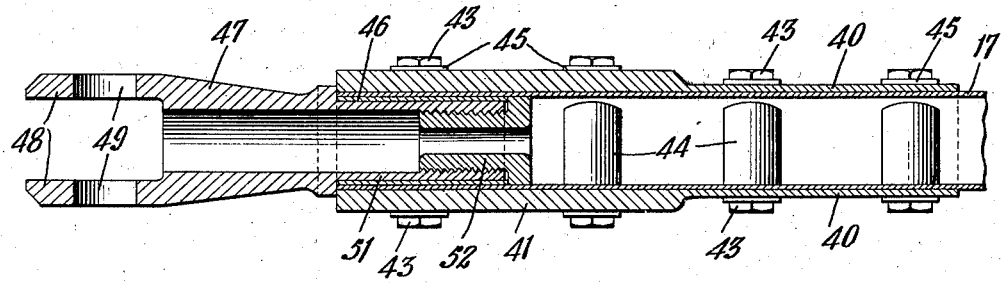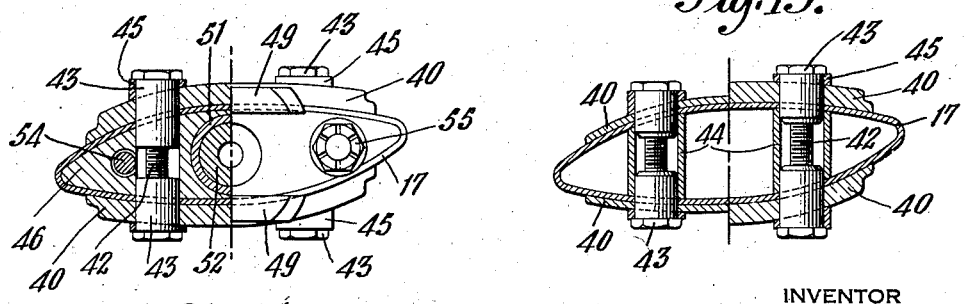

April 4, 1939.  J. A. J. BENNETT  2,152,861
BLADE CONSTRUCTION FOR AIRCRAFT SUSTAINING ROTORS
Filed May 14, 1935    4 Sheets-Sheet 4
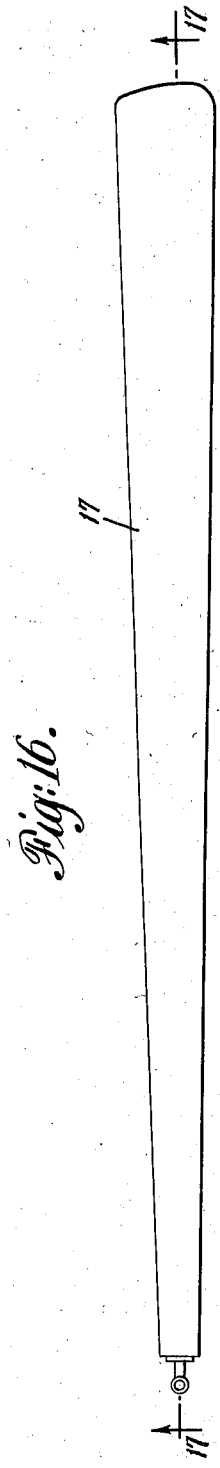
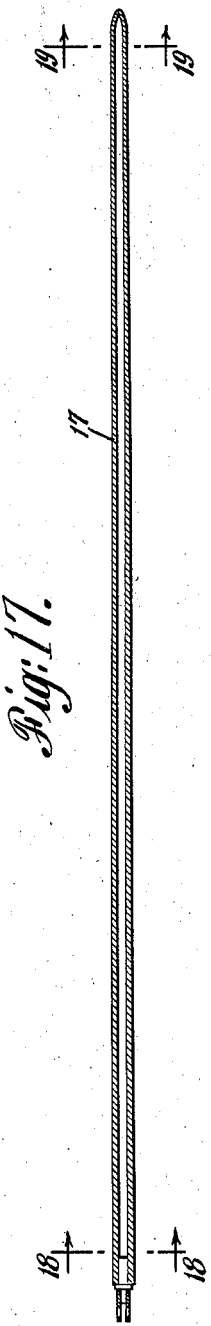
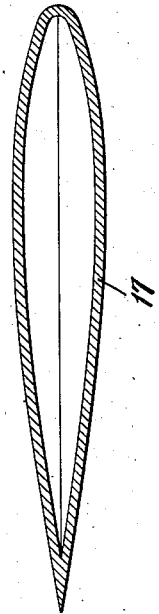
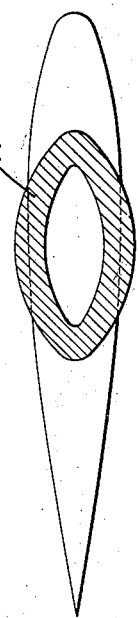
INVENTOR
James Allan Jamieson Bennett
BY
Synnestvedt + Lechner
ATTORNEYS Patented Apr. 4, 1939

2,152,861

UNITED STATES PATENT OFFICE 2,152,861

BLADE CONSTRUCTION FOR AIRCRAFT SUSTAINING ROTORS

James Allan Jamieson Bennett, Genista, Newton Mearns, Scotland, assignor, by mesne assignments, to Autogiro Company of America, a corporation of Delaware Application May 14, 1935, Serial No. 21,453
In Great Britain May 16, 1934

28 Claims. (Cl. 244—18)

The present invention relates to blades for aircraft sustaining rotors and more particularly for wind driven rotors of the kind that have been called "articulated", in which the blades are freely hinged to the hub member to swing in planes substantially perpendicular to the rotative path. Certain features of the invention refer especially to the blades of "doubly-articulated" rotors in which the blades are also free to swing relatively to one another in the general plane of rotation.

In my British Patent Specification No. 399,446 (and in the corresponding United States application, Serial No. 727,012 which has issued as Patent No. 2,067,228, dated January 12, 1937) a form of blade construction was described incorporating a metal spar composed of tubing of aerofoil section over the leading portion of the blade. The present invention refers to improvements in this form of construction and to improved alternative means of attachment of the spar to the rotor hub, one object being to provide a form of rotor blade, simple and cheap to construct, yet stronger and lighter than the form hitherto proposed.

The features of the invention may be described under three headings: (i) the spar; (ii) the fairing; (iii) the root attachment.

Considering first the spar, this member must be capable of resisting the static bending imposed on it when the blade is at rest and is supported only at its root as a cantilever, and also the dynamic bending when the blade having little or zero angular speed falls on its root support due to taxying over rough ground, gusty weather or any other cause. It must also withstand the centrifugal tension due to its mass in rotation, and the bending caused by the loads experienced in flight. It has been found that the maximum bending moment when the blade has zero angular speed occurs at the root of the blade and that the maximum bending moment in flight generally occurs near the middle of the blade. Consequently in a spar tube of constant cross section from root to tip local regions are heavily stressed, other parts being understressed, so that the full strength of the material is not developed throughout.

According to one feature of this invention a rotary blade of the kind herein referred to comprises a tubular spar whose leading portion is of aerofoil section, and whose resistance to bending is non-uniform from root to tip, being graded so that the stress distribution approximates more closely to uniformity than with a constant cross section spar tube, either in flight or when the blade is not rotating or in both conditions.

In one such arrangement the cross section of the spar tubing is non-uniform from root to tip. The tubing may have a constant thickness and non-uniform periphery, or a non-uniform periphery and thickness. Alternatively, the tubing may be of uniform cross section and be locally reinforced by cover plates secured to the tubing by rivets or other suitable means. Internal or external sleeves may be used instead of cover plates. A further alternative form of spar according to the invention comprises two or more lengths of tubing assembled telescopically and attached together by rivets or other connecting means, or held by friction.

The simpler and cheaper spar consists of tubing whose leading portion is of aerofoil section and of uniform cross section from root to tip but locally strengthened by one or more internal sleeves consisting of tubing of smaller periphery than the main tubing but substantially of the same shape except at the ends of the greatest diameter of the cross section. The internal sleeve before insertion in the main tubing is made with an external depth greater than the internal depth of the main tubing and therefore does not fit inside the latter without first being elastically strained, so that when it is placed in position it is held mainly by friction. It may also be rivetted or secured by other means to the main tubing.

According to another feature of this invention when the aerofoil section is unsymmetrical the spar is preferably composed of tubing in which the aerofoil profile extends over a greater proportion of the upper surface than of the lower surface. One advantage of this is that the tubing may be made more nearly symmetrical about two perpendicular axes, thereby facilitating the shaping of the spar. Another advantage is that the juncture of the fairing to the spar on the upper surface is further from the leading edge of the aerofoil section than heretofore, which is of aerodynamic importance, in obtaining an exceptionally smooth surface in the region where that is of most consequence.

A further feature of the invention refers to the fairing, i. e. that portion of the blade or wing which is attached to the rear of the structural member, i. e. the spar, to form with the latter an aerofoil section; and according to this feature of the invention the said fairing consists of a practically solid mass of light material which is suitably attached to the metal spar. Owing to the small proportion of fairing necessary in a blade constructed according to this invention the stresses in such a fairing are very small. The fairing may conveniently consist mainly of balsa wood, but since this material is not suitable in the form of sharp wedges, spruce or other suitable material may be used for the parts of the fairing which present sharp corners in cross section, i. e. the parts next the spar on the upper and lower surfaces and the trailing edge.

The whole depth of the part of the fairing next the spar is preferably of spruce and this spruce member is preferably secured to the spar by suitably spaced bolts. To enable the heads of the bolts to be introduced into the inside of the spar, the bolt holes may be slotted so that the bolt head can be passed through the hole and the shank then slipped into the slot.

Balsa wood is glued to the spruce core and finally plugs of balsa or cork are fitted into holes which are provided for the entry of a box spanner for tightening up the nuts of the above-mentioned bolts.

Such bolts may also be used for carrying lead washers or similar weights necessary for balancing the blades, such weights being placed at or near two-thirds of the distance from root to tip. Heretofore these weights have been placed near the tip of the blade but weights so located to balance the blades statically put the blades out of balance dynamically.

The spruce member may be glued to the metal spar tube in addition to the bolt fixation, and where safety considerations permit it the bolts may be omitted, the fairing being attached to the spar only by the glue and the outer covering of fabric hereinafter referred to.

The balsa part of the fairing may be reinforced by occasional ribs of spruce or other suitable material spaced at intervals along the blade and glued to the balsa. The spruce trailing edge is preferably joined to the balsa by a plywood insertion or tongue glued into grooves formed in both spruce and balsa members.

An outer covering of fabric may be used to bind the blade together and is glued or doped to the fairing and spar.

The blade tip may be constructed of solid balsa which is glued to the balsa fairing and to the inside of the spar tube. It is preferably shaped as shown in the accompanying drawings and as hereinafter described.

The root attachment of the spar to the rotor hub preferably consists of a bush which may advantageously be of steel and phosphor bronze embedded in the spar, the latter being internally sleeved as already described. This arrangement is more particularly applicable to a rotor blade which is doubly articulated as above described. In this case the substantially vertical pin hereinafter referred to as the "drag articulation pivot", on which blade movements in the general plane of rotation take place, is made to pass through the bush and connects the blade to the articulating link or extension block which connects the vertical pin to the horizontal pin in a manner which need not be illustrated in the present case, as it is now known in this art (as exemplified for instance in United States Patent 1,985,819). Preferably the drag articulating pin should be so located that the centrifugal load passes through or approximately through its centre.

The function of the internal sleeve or sleeves at the blade root is not only to reduce bending stresses but to reduce the bearing stress on the spar tube due to the centrifugal load. Consequently the drag articulating pin is placed inboard, that is, on the hub side, of the rivets or other means which attach the internal sleeve or sleeves to the main spar tube.

In an alternative construction the spar tube is reinforced above and below by one or more pairs of cover plates. If two or more pairs are employed the inner pair is made to extend further along the spar tube than the outer pair, each pair of plates being conveniently secured to the spar tube and to the underlying pair of plates by a single transverse row of collared nuts and bolts. Finally all the plates and the spar tube are bolted or otherwise conveniently secured to a short internal block made of light metal and conforming in shape to the tube spar. The block is traversed by a tubular member which may be of steel having a flange abutting on the block and screw-threaded internally at its outer end for engagement by a flanged nut and forked at its inner end to embrace the articulating link to which it is attached by the drag articulating pin. The flanges which bear on the inner and outer faces of the internal block are locked together by bolts. The flange holes through which these bolts pass may be elongated circumferentially with respect to the longitudinal axis of the blade so that the blade angle may be adjusted if required.

Yet a further feature of the invention refers to a particular form of rotary blade incorporating a tubular spar, the leading part of whose cross section is of aerofoil profile and whose periphery is uniform from root to tip, while the resistance to bending is made non-uniform either by varying the wall thickness or by the use of internal sleeving or cover plates as above described. According to this further feature of the invention the aerofoil profile of the blade is non-uniform from root to tip having a variable fineness ratio as required by aerodynamic considerations and a constant maximum depth. In carrying into practice this feature of the invention the aerofoil profile of at least part of the blade is constructionally achieved, in one embodiment by the use of fairings at the leading edge of the blade as well as at the trailing part.

The aerofoil profile may be continuously varied along the length of the blade, or, alternatively, the aerofoil profile may be conveniently varied in steps; thus in one form of construction for a blade of this kind the blade form consists of two or three sections, each section having uniform aerofoil profile and a plan form with parallel leading and trailing edges, while the sections are joined to each other by means of intermediate sections having tapered plan form and graded aerofoil profile. The aerofoil profiles of the main sections present increasing fineness ratios from the root to the tip and since the maximum depth of the section is constant throughout the length of the blade the chord of the root section will be less than that of sections which are located further outboard. The cross section of the tubular spar may conveniently be such that its leading part corresponds to the aerofoil profile of the root section which therefore is completed by a trailing fairing only, while in the outer sections of the blade whose chord and fineness ratio are successively increased and decreased respectively from that of the root section, leading as well as trailing fairings should be provided.

How the foregoing objects and advantages, together with others which may be incident to the invention or may occur to those skilled in the art, are attained by the present invention, will be further apparent after consideration of the remainder of the description, taken together with the accompanying drawings, in which drawings:

Figure 1 is a cross sectional view of a rotor blade, illustrating one embodiment of the present invention, involving a reinforcement for the blade spar or tube, and diagrammatically indicating the blade profile;

Figure 2 is a cross section similar to Figure 1, showing details of the blade construction, but without any internal reinforcement for the spar;

Figure 3 is a fragmentary view showing a detail of the fastening device shown in Figure 2;

Figure 4 is a section similar to Figure 2, taken along the line 4—4 of Figure 5, through a spruce stiffening rib;

Figure 5 is a plan view of a rotor blade constructed in accordance with this invention;

Figure 6 is a plan view of a modified form of blade;

Figure 7 is an enlarged plan view of the outer or tip portion of the blade of Figure 6;

Figures 8, 9, 10 and 11 are sections taken, respectively, on the lines 8—8, 9—9, 10—10, and 11—11 of Figure 7;

Figure 12 is a plan view, partly in section, of the blade root assembly, on a larger scale than Figures 5 and 6;

Figures 13, 14 and 15 are sections taken, respectively, on the lines 13—13, 14—14, and 15—15 of Figure 12;

Figure 16 is a plan view of a modification of the invention, in which the tubular metallic spar itself may define the entire contour of the blade, and in which the blade is of a progressively tapering plan form, becoming of wider chord from the root toward the tip;

Figure 17 is a section taken on the line 17—17 of Figure 16 and illustrating the taper of the blade spar, and thus of the blade itself, both in external dimension and in wall thickness, the taper in this plane being the reverse of the taper in plan, i. e. a progressive decrease in section from the root toward the tip;

Figure 18 is a section taken on the line 18—18 of Figure 16; and

Figure 19 is a section taken on the line 19—19 of Figure 16.

In Figure 1, the blade profile is indicated at 16, the trailing portion of which will be described hereinafter with reference to other figures, and it will be seen that a large part of the profile is determined by the external contour of the tubular blade spar 17, which may be made of any suitable light alloy, and which may further be internally reinforced, either throughout its length or in desired places, as by the internal tubular sleeve 18. This sleeve has larger radii 18', 18' at its forward and rearward edges than the radii 17' of the spar tube, and is directly held in position by friction, although rivets, welding and the like may also be used. Such frictional grip may be obtained by making the external depth of the reinforcing sleeve greater than the internal depth of the tubular spar, when the sleeve and tube are in an unstrained state, so that the sleeve has to be somewhat compressed in the direction of its minor axis upon inserting it in the spar tube. Thus, when in position, its tendency to spring outward causes it to grip tightly on the inner surface of the spar tube.

Figure 1 also illustrates the new and improved cross sectional profile of the tubular spar itself, and its novel disposition or angular location, so to speak, within the blade profile considered as a whole. It will be seen that this formation and disposition make possible the utilization of the tube itself as the aerofoil defining contour of the blade to such an extent that about three-fourths of the exterior surface of said tube is coincident with the blade contour. The lower surface of the spar tube coincides with the aerofoil profile from the leading edge rearwardly about half the width of the spar, and practically the whole of the upper surface of the spar follows the aerofoil profile. It will be seen that by so disposing the spar tube, the section thereof may be made practically symmetrical about two perpendicular axes, and is therefore easier to manufacture than the sections of tubing previously employed.

Figure 2 illustrates one manner of completing the blade construction, which may be employed whether or not an internal reinforcing sleeve is used in the spar. To the rear part of the tube 17, spruce blocks 19 are secured, as by bolts 20, and the blade section is further continued by solid balsa wood blocks 21 which may be glued to the spruce 19. The trailing edge 22 is also preferably of spruce and is secured by means of one or more 3-ply tongues 23 which are keyed and glued into the balsa wood 21 and the spruce 22. A plurality of such tongues are illustrated in the construction shown in detail in Figure 7, whereas a single continuous tongue, extending the full length of the blade, is utilized in the construction shown in Figure 5. The blade is preferably reinforced at intervals by flat spruce ribs 28, inserted between the balsa wood blocks 21, a section through one of these ribs being shown in Figure 4; and a series of the ribs being illustrated in the plan view of Figure 5.

In order to insert the head of the bolt 20 into the inside of the spar tube 17, the bolt hole may be shaped as shown in Figure 3, with an enlarged aperture 24, through which the head of the bolt 20 can pass, and a side slot into which the shank of the bolt is slipped after insertion, thus causing the head to engage the inside of the spar tube 17. To permit of tightening the nut 25, after the glued-up assembly 19, 21, 23, 22 has been put in place, the balsa wood portion 21 is drilled from the outside, concentrically with the bolt 20, and through the hole thus formed a tool can be inserted for tightening the nut; this hole being finally closed or plugged by means of any suitable filler piece such as the cork block 26.

This method of assembling the blade is not only advantageous from a structural point of view, but also lends itself readily to using the structural parts for obtaining any desired weight distribution. For example, the washer 27 for the securing nut 25, as shown in Figure 2, is a thick lead washer, serving the additional purpose of acting as a balance weight, for balancing the blades. Such weights may be made of varying size and mass, and may be disposed at any desired point or points along the blade, for example as indicated at w in Figure 5, the point w being about two-thirds of the blade length from the root. If the blade is of proper balance and weight distribution, such heavy washers may be omitted.

In the modification shown in Figure 6, approximately the outer third of the blade is of increased chord, the details of this portion of the construction being shown in Figures 7 and 8. Furthermore, the aerofoil section of this outer third of the blade is of smaller thickness/chord ratio than the aerofoil section of the inner part of the blade. In the formation of this part of the blade of Figure 6, the trailing portion may be constructed in a manner similar to that described with reference to Figure 2, but the leading portion comprises an additional block, preferably of spruce, seen at 29 in Figure 8, which is secured by means of a metallic (preferably brass) leading edge strip 30, bolts 31 and nuts 32; the spruce block or strip 29 being slotted or recessed along its leading edge to receive the brass strip 30, and the said strip being slotted at intervals along the nose, as shown at 33, to receive the nuts 32, so that the latter do not project from the aerofoil section.

The heads of bolts 31 may be passed through, into the inside of the spar 17, in a manner similar to that illustrated at Figure 3, and to give the bolt heads a proper bearing on the inside of the spar tube, which at this point has a smaller radius, packing washers 34, shaped to fit the inside of the spar tube, are used; these being preferably of light alloy, so as not to add too much weight at this point of the blade section.

In either of the two general forms above described, the tip of the blade (indicated at 35 in Figure 5 and at 36 in Figure 6) may be completed as shown in Figures 9 to 11 inclusive. The contour of the tip portion is defined by a body of balsa wood 37 (see Figures 7, 9, 10 and 11) which may consist of an upper and lower block separated by and glued to a horizontal sheet of 3-ply material 38. The inner end of this tip portion is reduced or cut away to provide an extension or spigot 37' to fit the inside of the spar tube 17, and may be secured therein by hollow tubular rivets 39.

For efficient aerodynamic action, I shape the tip member (35 of Figure 5 or 36 of Figure 6) in the manner shown by the enlarged view of Figure 7. The leading edge is, from A to B, a quadrant of a circle with its center C on the spar center line; and the cross sections E, F, and G (one of which is shown in Figure 10) are all geometrically similar, diminishing in size as the extreme tip is approached. The shape of the trailing edge B—D of the blade tip is determined so that each cross section EFG is divided in the same proportionality by the line C—B, i. e. the ratio E—F/F—G is constant.

Turning now to Figures 12 to 15 inclusive, it will be seen that the root end of the blade spar 17 is reinforced externally by upper and lower cover plates or gripping members 40. These are stepped up in thickness toward their inner ends, as shown at 41, and are secured to the spar tube by four rows of fasteners of any suitable type, two in each of the four rows. I prefer to employ "scrivets" for the purpose ("scrivet" being a term which has been coined as an abbreviation of "screw" and "rivet"), each scrivet consisting of a threaded shank 42 on which are screwed two nuts 43 having barrels which enter the rivet holes. The outer three rows of scrivets are provided with tubular sleeves 44 which strut the spar tube internally against crushing when the scrivets are tightened; these sleeves being inserted from the inner end of the spar tube before completing the root end of the assembly. The heads of the scrivets seat on saddle washers 45.

The reinforcing plates 40 are necked or reduced in width between the two outer rows of scrivets, as at 40a, this reduction of cross sectional area of the cover plates at that point being calculated according to elastic theory so as to equalize the loading as between the outer two rows of scrivets. The inner end of the spar tube is plugged by a solid block 46, of suitable light alloy, through which the scrivets of the innermost row pass, this block being secured to the blade root socket member 47 which is forked at 48 to embrace the drag link, and drilled at 49 to receive the drag pivot. The blade root socket or shank member is hollow, is flanged at 50 to bear against the inner face of the block 46, and is extended outwardly at 51 to form an internally threaded sleeve or spigot which receives the externally threaded sleeve or spigot 52 of a flange member 53 located at the outer face of the block 46. When the two threaded tubular members are screwed together within the hollow cylindrical bore of the block 46, said block is gripped between the flanges, and this whole assembly is secured together by bolts 54 and nuts 55. The bolts pass through transversely elongated holes through the block (for purposes of blade incidence adjustment) and the flange member 53 may be locked as against turning, by means of a set screw 56.

Turning now to the modification shown in Figures 16 to 19 inclusive, it will be seen that I have evolved a construction in which the tubular spar itself defines the blade, and in which it (and thus the blade) tapers both in plan and in profile, as well as in wall thickness. In plan form, the blade becomes progressively wider of chord, toward the tip, so that a large proportion of the blade area lies in the region of greatest peripheral speed and effectiveness. In the opposite plane, on the other hand, the tube (and thus the wing) tapers to a thinner section at the tip, and the wall thickness also tapers, so that the greatest strength is obtained in the region where it is most needed, with the minimum amount of weight. Furthermore, the blade section changes from one of double blunt nosed profile adjacent the root to a good streamline form adjacent the tip, which gives maximum aerodynamic efficiency in both regions. This type of construction may be made of sheet metal, bent to form, and welded or riveted at the seams, or shaped by means of mandrels and/or under hydraulic pressure.

Without further amplification of this description, it will now be evident that the various objects, advantages and principles of operation, as fully set forth in the forepart of this specification, may be obtained by this invention, in a number of different structural embodiments.

I claim:

1. For aircraft sustaining rotors, an elongated rotor blade of aeroform cross section having a main longitudinal tubular spar member, the external contour of said spar defining at least a large part of the blade profile, a trailing edge structure built up on said spar throughout a major part of the length of the blade and a built up nose portion along approximately the outer third of the blade.

2. In an autorotatable sustaining rotor, an aeroform rotor blade in which the main longitudinal strength member is a tubular metallic spar defining at least a substantial part of the aeroform contour of the blade, said spar being of progressively varying dimension from one end toward the other viewed in plan, and of inversely varying dimension viewed in elevation.

3. In an autorotatable sustaining rotor, an aeroform rotor blade having a progressively increasing chord and progressively decreasing weight from the region near the root end to the region near the tip end.

4. In an autorotatable sustaining rotor, an aeroform rotor blade having a progressively increasing chord and progressively decreasing weight from the region near the root end to the region near the tip end, said blade being formed at least in large part of a tubular metallic spar member.

5. In an autorotatable sustaining rotor, an aeroform rotor blade having a progressively increasing chord and progressively decreasing weight from the region near the root end to the region near the tip end, said blade being formed at least in large part of a tubular metallic spar member, the wall thickness of which progressively decreases from adjacent the root to adjacent the tip.

6. In an aircraft sustaining rotor, an elongated rotor blade which in profile is almost entirely of unsymmetrical bi-convex section, comprising a main longitudinal tubular metallic spar member of substantially symmetrical flattened oval or bi-convex section the major axis of which is at a substantial angle to the major axis of that portion of the blade section in which it lies, said tubular spar throughout the major part of the blade length occupying the forward half of the blade section and the nose of the spar coinciding with the nose profile of the blade, approximately only one-half of the lower convex face of said spar coinciding with the lower profile of the blade and nearly the entire upper convex face of said spar coinciding with the upper profile of the blade, a lighter-weight trailing structure extending from the trailing edge of the blade to the rear edge of said spar at the upper face of the blade and to about the middle of said spar at the lower face of the blade whereby an extended abutting surface contact between spar and trailing structure is obtained, and means fixedly securing the trailing structure to said spar.

7. In an aircraft sustaining rotor, an elongated rotor blade which in profile is almost entirely of unsymmetrical bi-convex section, comprising a main longitudinal tubular metallic spar member of substantially symmetrical flattened oval or bi-convex section the major axis of which is at a substantial angle to the major axis of that portion of the blade section in which it lies, said tubular spar throughout the major part of the blade length occupying the forward half of the blade section and the nose of the spar coinciding with the nose profile of the blade, approximately only one-half of the lower convex face of said spar coinciding with the lower profile of the blade and nearly the entire upper convex face of said spar coinciding with the upper profile of the blade, a lighter-weight trailing structure extending from the trailing edge of the blade to the rear edge of said spar at the upper face of the blade and to about the middle of said spar at the lower face of the blade whereby an extended abutting surface contact between spar and trailing structure is obtained, and means fixedly securing the trailing structure to said spar, and, in a limited region of the blade, a light-weight extended nose structure similarly associated with and secured to the leading edge of the spar.

8. In an aircraft sustaining rotor, an elongated rotor blade which in profile is almost entirely of unsymmetrical bi-convex section, comprising a main longitudinal tubular metallic spar member of substantially symmetrical flattened oval or bi-convex section the major axis of which is at a substantial angle to the major axis of that portion of the blade section in which it lies, said tubular spar throughout the major part of the blade length occupying the forward half of the blade section and the nose of the spar coinciding with the nose profile of the blade, approximately only one-half of the lower convex face of said spar coinciding with the lower profile of the blade and nearly the entire upper convex face of said spar coinciding with the upper profile of the blade, a lighter-weight trailing structure extending from the trailing edge of the blade to the rear edge of said spar at the upper face of the blade and to about the middle of said spar at the lower face of the blade whereby an extended abutting surface contact between spar and trailing structure is obtained, means fixedly securing the trailing structure to said spar, and the structure secured to said spar being of increased chord in the tip or outer region of the blade.

9. In an aircraft sustaining rotor, an elongated rotor blade which in profile is almost entirely of unsymmetrical bi-convex section, comprising a main longitudinal tubular metallic spar member of substantially symmetrical flattened oval or bi-convex section the major axis of which is at a substantial angle to the major axis of that portion of the blade section in which it lies, said tubular spar throughout the major part of the blade length occupying the forward half of the blade section and the nose of the spar coinciding with the nose profile of the blade, approximately only one-half of the lower convex face of said spar coinciding with the lower profile of the blade and nearly the entire upper convex face of said spar coinciding with the upper profile of the blade, a lighter-weight trailing structure extending from the trailing edge of the blade to the rear edge of said spar at the upper face of the blade and to about the middle of said spar at the lower face of the blade whereby an extended abutting surface contact between spar and trailing structure is obtained, and means fixedly securing the trailing structure to said spar, the trailing structure being in the form of a solid mass of light material.

10. In an aircraft sustaining rotor, an elongated rotor blade which in profile is almost entirely of unsymmetrical bi-convex section, comprising a main longitudinal tubular metallic spar member of substantially symmetrical flattened oval or bi-convex section the major axis of which is at a substantial angle to the major axis of that portion of the blade section in which it lies, said tubular spar throughout the major part of the blade length occupying the forward half of the blade section and the nose of the spar coinciding with the nose profile of the blade, approximately only one-half of the lower convex face of said spar coinciding with the lower profile of the blade and nearly the entire upper convex face of said spar coinciding with the upper profile of the blade, a lighter-weight trailing structure extending from the trailing edge of the blade to the rear edge of said spar at the upper face of the blade and to about the middle of said spar at the lower face of the blade whereby an extended abutting surface contact between spar and trailing structure is obtained, and means fixedly securing the trailing structure to said spar, the trailing structure further incorporating a stiffening member at the trailing edge.

11. In an aircraft sustaining rotor, an elongated rotor blade which in profile is almost entirely of unsymmetrical bi-convex section, comprising a main longitudinal tubular metallic spar member of substantially symmetrical flattened oval or bi-convex section the major axis of which is at a substantial angle to the major axis of that portion of the blade section in which it lies, said tubular spar throughout the major part of the blade length occupying the forward half of the blade section and the nose of the spar coinciding with the nose profile of the blade, approximately only one-half of the lower convex face of said spar coinciding with the lower profile of the blade and nearly the entire upper convex face of said spar coinciding with the upper profile of the blade, a lighter-weight trailing structure extending from the trailing edge of the blade to the rear edge of said spar at the upper face of the blade and to about the middle of said spar at the lower face of the blade whereby an extended abutting surface contact between spar and trailing structure is obtained, and means fixedly securing the trailing structure to said spar, the trailing structure further incorporating an elongated strengthening wood-block in abutting relation to the spar.

12. In an aircraft sustaining rotor, an elongated rotor blade which in profile is almost entirely of unsymmetrical bi-convex section, comprising a main longitudinal tubular metallic spar member of substantially symmetrical flattened oval or bi-convex section the major axis of which is at a substantial angle to the major axis of that portion of the blade section in which it lies, said tubular spar throughout the major part of the blade length occupying the forward half of the blade section and the nose of the spar coinciding with the nose profile of the blade, approximately only one-half of the lower convex face of said spar coinciding with the lower profile of the blade and nearly the entire upper convex face of said spar coinciding with the upper profile of the blade, a lighter-weight trailing structure extending from the trailing edge of the blade to the rear edge of said spar at the upper face of the blade and to about the middle of said spar at the lower face of the blade whereby an extended abutting surface contact between spar and trailing structure is obtained, means fixedly securing the trailing structure to said spar, and a re-enforcing sleeve in telescopic relation to said spar.

13. In an aircraft sustaining rotor, an elongated rotor blade which in profile is almost entirely of unsymmetrical bi-convex section, comprising a main longitudinal tubular metallic spar member of substantially symmetrical flattened oval or bi-convex section the major axis of which is at a substantial angle to the major axis of that portion of the blade section in which it lies, said tubular spar throughout the major part of the blade length occupying the forward half of the blade section and the nose of the spar coinciding with the nose profile of the blade, approximately only one-half of the lower convex face of said spar coinciding with the lower profile of the blade and nearly the entire upper convex face of said spar coinciding with the upper profile of the blade, a lighter-weight trailing structure extending from the trailing edge of the blade to the rear edge of said spar at the upper face of the blade and to about the middle of said spar at the lower face of the blade whereby an extended abutting surface contact between spar and trailing structure is obtained, means fixedly securing the trailing structure to said spar, and a re-enforcing sleeve in telescopic relation to said spar and under compression therein so as to be retained by friction as against dislodgment by the centrifugal force of rotation.

14. In an aircraft sustaining rotor, an elongated rotor blade which in profile is almost entirely of unsymmetrical bi-convex section, comprising a main longitudinal tubular metallic spar member of substantially symmetrical flattened oval or bi-convex section the major axis of which is at a substantial angle to the major axis of that portion of the blade section in which it lies, said tubular spar throughout the major part of the blade length occupying the forward half of the blade section and the nose of the spar coinciding with the nose profile of the blade, approximately only one-half of the lower convex face of said spar coinciding with the lower profile of the blade and nearly the entire upper convex face of said spar coinciding with the upper profile of the blade, a lighter-weight trailing structure extending from the trailing edge of the blade to the rear edge of said spar at the upper face of the blade and to about the middle of said spar at the lower face of the blade whereby an extended abutting surface contact between spar and trailing structure is obtained, means fixedly securing the trailing structure to said spar, and a re-enforcing sleeve of different curvature located in telescopic relation to said spar.

15. In an aircraft sustaining rotor, an elongated rotor blade which in profile is almost entirely of unsymmetrical bi-convex section, comprising a main longitudinal tubular metallic spar member of substantially symmetrical flattened oval or bi-convex section the major axis of which is at a substantial angle to the major axis of that portion of the blade section in which it lies, said tubular spar throughout the major part of the blade length occupying the forward half of the blade section and the nose of the spar coinciding with the nose profile of the blade, approximately only one-half of the lower convex face of said spar coinciding with the lower profile of the blade and nearly the entire upper convex face of said spar coinciding with the upper profile of the blade, a lighter-weight trailing structure extending from the trailing edge of the blade to the rear edge of said spar at the upper face of the blade and to about the middle of said spar at the lower face of the blade whereby an extended abutting surface contact between spar and trailing structure is obtained, means fixedly securing the trailing structure to said spar, and a solid blade tip member let into and secured within the outer end of said spar.

16. In an aircraft sustaining rotor, an elongated rotor blade which in profile is almost entirely of unsymmetrical bi-convex section, comprising a main longitudinal tubular metallic spar member of substantially symmetrical flattened oval or bi-convex section the major axis of which is at a substantial angle to the major axis of that portion of the blade section in which it lies, said tubular spar throughout the major part of the blade length occupying the forward half of the blade section and the nose of the spar coinciding with the nose profile of the blade, approximately only one-half of the lower convex face of said spar coinciding with the lower profile of the blade and nearly the entire upper convex face of said spar coinciding with the upper profile of the blade, a lighter-weight trailing structure extending from the trailing edge of the blade to the rear edge of said spar at the upper face of the blade and to about the middle of said spar at the lower face of the blade whereby an extended abutting surface contact between spar and trailing structure is obtained, means fixedly securing the trailing structure to said spar, and mechanism for securing the root end of said spar to the rotor hub including a block member inside the spar and load distributing plate members outside the spar.

17. In an aircraft sustaining rotor, an elongated rotor blade which in profile is almost entirely of unsymmetrical bi-convex section, comprising a main longitudinal tubular metallic spar member of substantially symmetrical flattened oval or bi-convex section the major axis of which is at a substantial angle to the major axis of that portion of the blade section in which it lies, said tubular spar throughout the major part of the blade length occupying the forward half of the blade section and the nose of the spar coinciding with the nose profile of the blade, approximately only one-half of the lower convex face of said spar coinciding with the lower profile of the blade and nearly the entire upper convex face of said spar coinciding with the upper profile of the blade, a lighter-weight trailing structure extending from the trailing edge of the blade to the rear edge of said spar at the upper face of the blade and to about the middle of said spar at the lower face of the blade whereby an extended abutting surface contact between spar and trailing structure is obtained, means fixedly securing the trailing structure to said spar, and mechanism for securing the root end of said spar to the rotor hub including reinforcing plate members formed to fit the upper and lower faces of the spar, and securing elements extending through the spar and plate members and having means positioned to serve as internal bracing struts for the spar.

18. For an autorotatable sustaining rotor, an aeroform rotor blade of high aspect ratio or greatly elongated plan form, whereof the main longitudinal strength member is a metallic spar of a cross-section having major and minor axes and defining at least a substantial part of the aeroform contour of the blade, said spar being unidirectionally tapered along most of its length.

19. For an autorotatable sustaining rotor, an aeroform rotor blade of high aspect ratio or greatly elongated plan form, whereof the main longitudinal strength member is a metallic spar of a cross-section having major and minor axes and defining at least a substantial part of the aeroform contour of the blade, said spar being unidirectionally tapered along most of its length in the sense of a decreasing minor cross-sectional axis toward the tip region of the blade.

20. For an autorotatable rotor, an aeroform rotor blade of high aspect ratio or greatly elongated plan form, whereof the main longitudinal strength member is a metallic spar of a cross-section having major and minor axes and defining at least a substantial part of the aeroform contour of the blade, said spar being unidirectionally tapered along most of its length in the sense of an increasing major cross-sectional axis toward the tip region of the blade.

21. For an autorotatable sustaining rotor, an aeroform rotor blade of high aspect ratio or greatly elongated plan form, whereof the main longitudinal strength member is a metallic spar of a cross section having major and minor axes and defining at least a substantial part of the aeroform contour of the blade, said spar being unidirectionally tapered along most of its length as to at least one of its said cross-sectional axes and being also unidirectionally tapered in wall thickness along most of its length.

22. For an autorotatable sustaining rotor, an aeroform rotor blade of high aspect ratio or greatly elongated plan form, whereof the main longitudinal strength member is a metallic spar of a cross-section having major and minor axes and defining at least a substantial part of the aeroform contour of the blade, said spar being unidirectionally tapered along most of its length as to at least one of its said cross-sectional axes and being also unidirectionally tapered in wall thickness along most of its length, the taper of wall thickness being in the sense of a decrease in thickness toward the tip region of the blade.

23. For an autorotatable sustaining rotor, an aeroform rotor blade of high aspect ratio or greatly elongated plan form and having its chord and its thickness each unidirectionally tapered throughout most of the blade length.

24. For an autorotatable sustaining rotor, an aeroform rotor blade of high aspect ratio or greatly elongated plan form and having its chord and its thickness inversely unidirectionally tapered throughout most of the blade length.

25. For an autorotatable sustaining rotor, an aeroform rotor blade of high aspect ratio or greatly elongated plan form and having its chord and its thickness inversely unidirectionally tapered throughout most of the blade length, the chord progressively increasing toward the tip region of the blade and the thickness progressively decreasing.

26. For an autorotatable sustaining rotor, an aeroform rotor blade of high aspect ratio or greatly elongated plan form having a non-structural mass weighting the blade at a point approximately two-thirds of the tip radius thereof.

27. For an autorotatable sustaining rotor, an aeroform rotor blade of high aspect ratio or greatly elongated plan form having an adjustable non-structural mass weighting the blade at a point approximately two-thirds of the tip radius thereof.

28. In an autorotatable sustaining rotor, an aeroform rotor blade having a progressively increasing chord and progressively decreasing weight and thickness from the region near the root end to the region near the tip end.

JAMES ALLAN JAMIESON BENNETT.